Dec. 30, 1947. G. FAULDS 2,433,605
VEHICLE WHEEL
Filed April 4, 1945 3 Sheets-Sheet 1

WITNESSES

INVENTOR:
George Faulds,
BY Paul & Paul
ATTORNEYS.

Dec. 30, 1947. G. FAULDS 2,433,605
VEHICLE WHEEL
Filed April 4, 1945 3 Sheets-Sheet 2
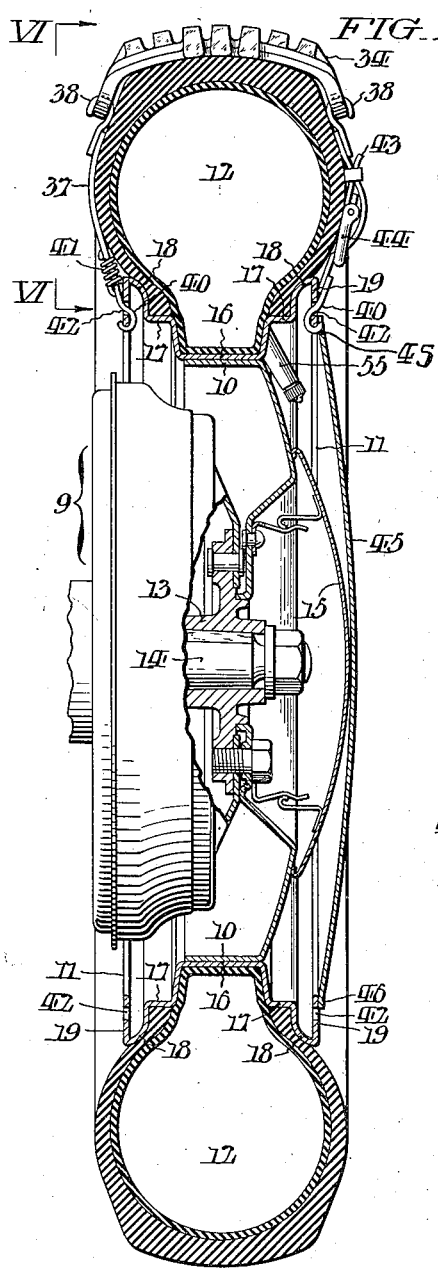
WITNESSES
Thomas W. Kerr, Jr.
Hubert Fuchs
INVENTOR:
George Faulds,
BY Paul & Paul
ATTORNEYS.

Dec. 30, 1947.   G. FAULDS   2,433,605
VEHICLE WHEEL
Filed April 4, 1945   3 Sheets-Sheet 3
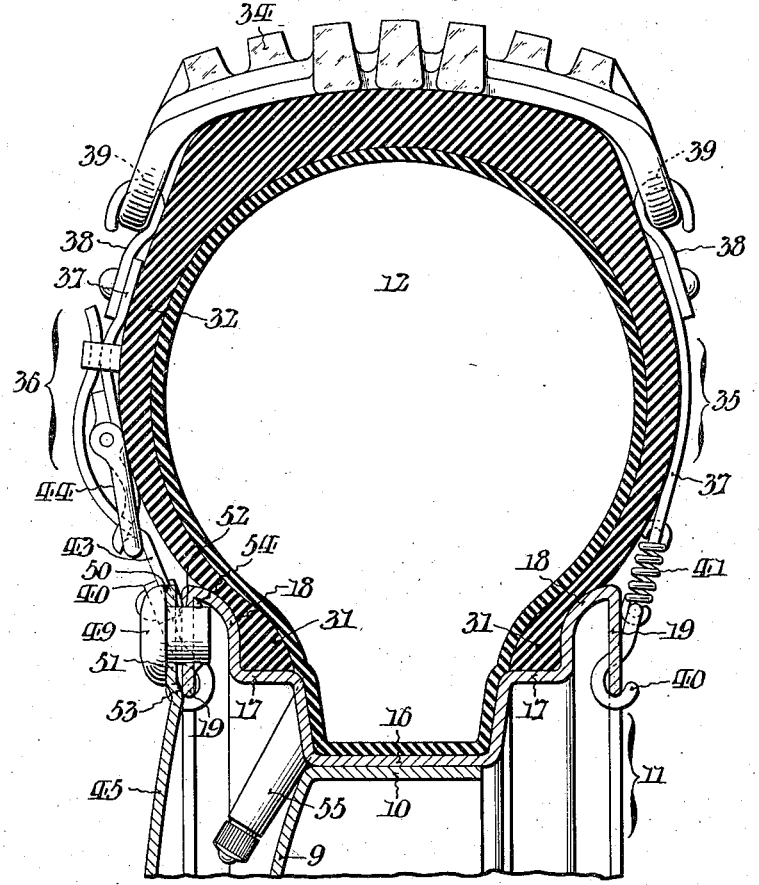
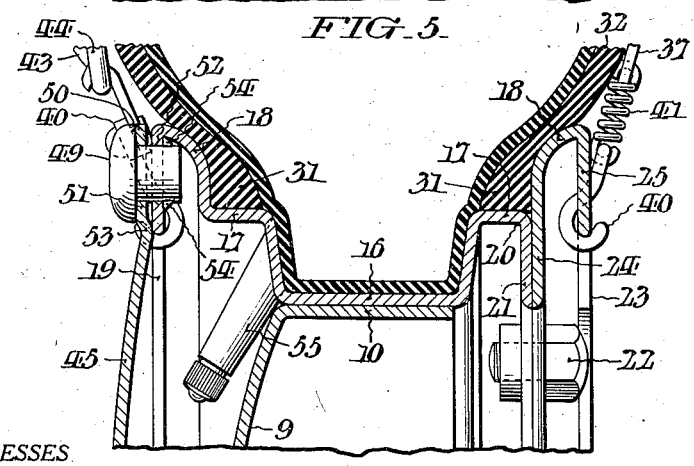
WITNESSES
Thomas W. Kerr, Jr.
Hubert Fuchs
INVENTOR:
George Faulds,
BY Paul & Paul
ATTORNEYS.

Patented Dec. 30, 1947

2,433,605

UNITED STATES PATENT OFFICE 2,433,605

VEHICLE WHEEL

George Faulds, Philadelphia, Pa.

Application April 4, 1945, Serial No. 586,480

6 Claims. (Cl. 301—37)

This invention relates to vehicle wheels and, more particularly, has reference to the species or type thereof commonly used on motor cars, auto-trucks and analogous self-propelled vehicles.

Wheels of the kind referred to, while measurably satisfactory in use, are either of too complicated design, or are capable of ready dismantling by unauthorized persons; or easy removal in part or entirely by thieves. It is a fundamental aim of my invention to overcome the noted disadvantages by providing a novel demountable vehicle wheel which is comparatively simple in construction and inexpensive to manufacture; easy to put on or take off; and which, furthermore, when assembled effectively prevents illicit removal or similar tampering with the inflation valve for surreptitious release and theft of the tire.

A further aim is to provide a wheel of the indicated species including provisions whereby appropriate anti-skid devices can be applied to, or removed from, the wheel without disturbing any part or component thereof; while such devices are so anchored to the wheel that they are restrained against "creeping" circumferentially or transversely of the tread of the tire.

While the stated definitions are indicative of the main aims of this invention, other objects with ancillary advantages will be evident to those skilled in the art upon a full understanding of the construction, arrangement and combinations of means hereafter fully disclosed; but it will also be appreciated that said invention is susceptible of other embodiments, or structurally modified forms, coming equally within the terms and scope of the concluding claims.

Figure 1:
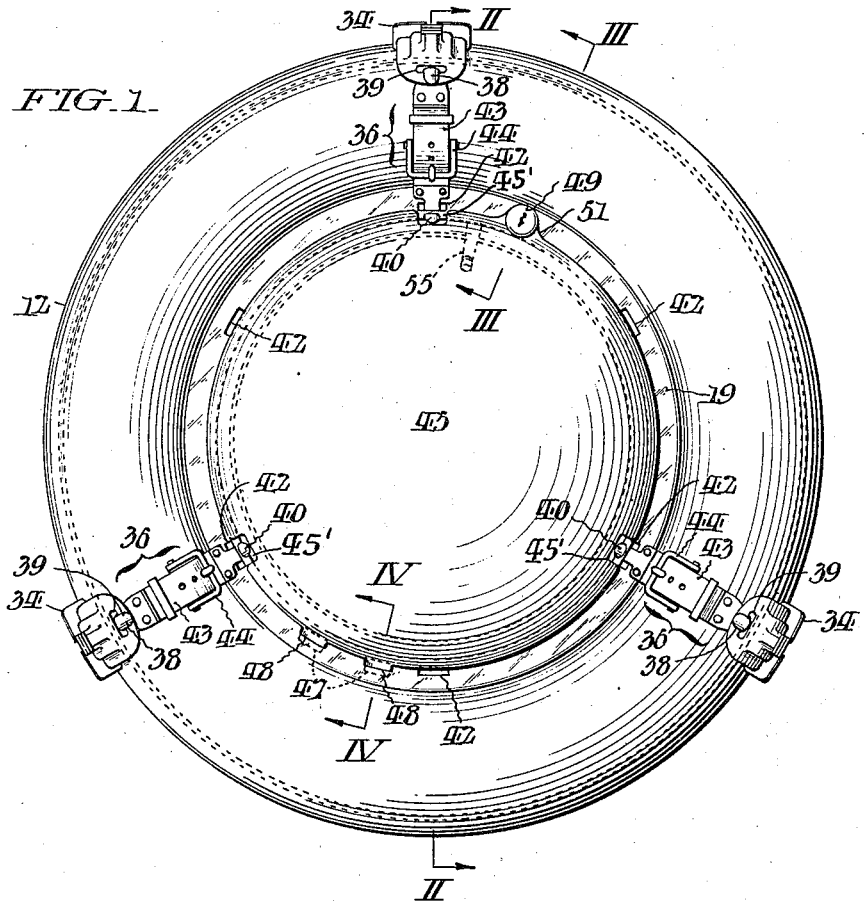

In the accompanying drawings:

Fig. 1 is a side elevation of an automobile wheel constructed in accordance with one practical embodiment of this invention.

Fig. 2, Sheet 2, is a larger scale part elevational view and part transverse cross-section of the same, taken approximately as indicated by the angled arrows II—II in Fig. 1.

Fig. 3, Sheet 3, is a further enlarged transverse cross-section taken substantially as designated by the angled arrows III—III in Fig. 1.

Fig. 4, Sheet 2, is a fragmentary transverse cross-section taken on the plane designated IV—IV in Fig. 1 but drawn to larger scale for clearer illustration of important details.

Fig. 5, Sheet 3, is a similar view to the lower half-portion of Fig. 3, but showing a slight modification thereof.

Fig. 6, Sheet 2, is a fragmentary view taken substantially as indicated by the angled-arrows VI—VI at the left-hand upper part of Fig. 2.

Figure 7:
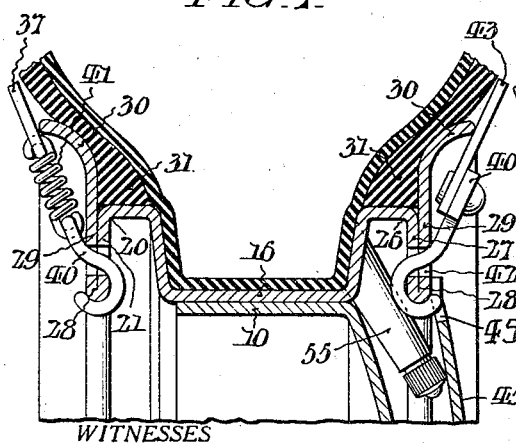
Figure 8:
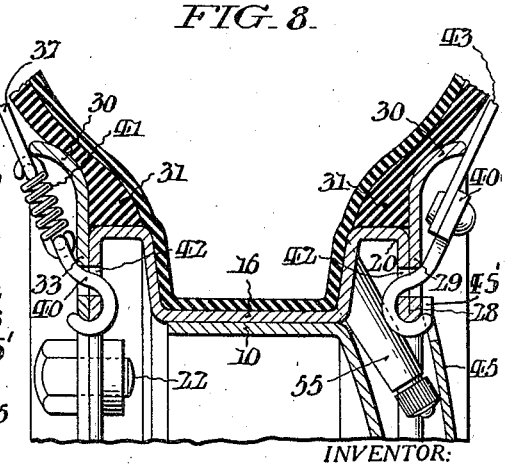

Fig. 7, Sheet 1, is a view similar to Fig. 3 of a further modified form of the invention; and, Fig. 8 is a similar view to Fig. 5 but showing a still further modification of this invention.

In the following detailed explanation of the embodiments of this invention shown by the above identified drawings, specific terms will be employed for the sake of clarity, but it is to be understood that such terms are used in a descriptive sense and not for any limitative reason; each said term being intended to embrace all technical equivalents which operate in a similar manner for an analogous purpose.

Referring more in detail to the drawings and first to Figs. 1 and 2, a conventional wheel body component of the disc-type is comprehensively designated by the reference character 9, said wheel embodying a circumferential flange 10 for application and securement thereon of a novel drop-center rim 11, in which the tire 12 seats; while the wheel 9 also includes a hub 13 by which it is supported on the axle 14, and such hub 13 is closed in by a snap-on cap 15; all of said parts being merely referred to by way of providing a proper base for explanation of the features of invention now to be described.

The drop-center rim 11 of this invention, as shown in Figs. 2, 3 and 4, it will be remarked, is appropriately shaped, or spun, to comprise a central circumferential channel-like depression 16 with flanking concentric cylindrical portions 17, said latter portions having outwardly-directed opposed flares 18 each embodying an in-turned peripheral flat annular part 19. These annular parts 19, it is to be noted, spacedly parallel the general plane of the wheel 9 while they jointly serve to considerably strengthen and rigidify the rim 11 as a unit.

In the modified form of drop-center rim 11 shown by Fig. 5 it will be observed that the left-hand side-portion conforms in cross-section with the preceding description in that it includes corresponding parts 16, 17, 18 and 19; but that the right hand cylindrical part 17 is abruptly turned inwards at 20 to provide a rectangularly-related flange 21. To this flange 21 there is attached, as by circumferentially-spaced securing means 22, an annular clamping ring 23 of somewhat U-section in that it embodies an inner part 24—complemental to the flares 18 previously explained—which is extended inward to confrontingly abut, and be attached to, the flange 21, as readily understood on an inspection of Fig. 5;

whereas the ring 23 also is provided with a flat annular outer part 25, corresponding to the inturned peripheral section 19 of Figs. 3 and 4, more particularly.

Fig. 7 shows a cross-section of rim 11, similar to Fig. 3, excepting that both cylindrical portions 17 are abruptly turned inwards at 20, 26 to define paralleling flanges 21, 27 the lower or inner portions of which are respectively retroverted at 28 to define abutment flanges 29 having their peripheral parts outwardly curved at 30, in conformity with the flares 18, for force reception of the bead portions 31 of the tire shoe 32 in conformity with known procedure. This particular form of rim construction ensures a very rigid and strong structure. On the other hand when it is desirable that the tire shoe 32 may be slid into position on the rim with but little effort, use is preferably made of the removable annular clamping-ring 23 shown in Fig. 5, or said ring may be substituted by the dished ring 33 of Fig. 8 which is secured in place by appropriate means 22, as before set forth, and needing no further explanation herein.

In order that the improved forms of wheel construction shown and described herein may have anti-skid devices 34, preferably of the type shown in my prior Patent No. 2,341,317, dated February 8, 1944, applied thereabout, use is conveniently made of the inner and outer strap means 35, 36 respectively, shown to best advantage in Figs. 1, 2 and 3. The inner strap means 35 comprises a flexible element 37 having a claw-hook 38 at one end for engagement at 39 outwardly through the flanking end of the device 34; and an eye-hook 40 coupled by a retractile spring 41, at the other end of said flexible element 37; the eye-hook 40 being passed through a slot 42 in the peripheral flange 19 with engagement around the inner edge of said flange as readily understood from Figs. 1–3. On the other hand the outer strap means 36 includes two aligned flexible elements 37, 43 connectable by an adjuster buckle 44; while each such element is provided with a claw-hook 38 and a similar hook 40 for respective application to the anti-skid device 34 and the slot 42 in the related flange 19 as aforesaid. Now it will be readily seen that the respective strap means 35, 36 are so designed and positioned as to greatly facilitate application to, or removal of, the anti-skid devices 34; while they are so arranged that when the elements 37, 43 are properly tightened-up by the buckle 44, the devices 34 are positively restrained against circumferential or transverse "creep" relative to the tire shoe 32.

In order that my improved demountable wheel 9 may be rendered safe against illicit dismantling by unauthorized persons, or the tire deflated and stolen, I preferably make use of a dished or concavo-convex disc 45 having a peripheral flat 46, see Fig. 4 to best advantage, adapted to concentrically overlap and firmly abut the outer face of the associated rim flange 19. This disc 45 is preferably provided with a pair of peripherally spaced and relatively-stepped tongues 47 engageable through a pair of special slots 48 provided for the purpose in the rim flange 19, so as to prevent any rattling thereof as well as peripherally spaced cut-outs or notches 45', registering with selected rim slots 44, for easy application and release of the hooks 40, without disturbing or releasing the disc 45, as readily understood on an examination of Figs. 1, 2, 7 and 8; while said disc 45 is conveniently secured in place by a snap-lock 49, preferably welded at 50, for instance, to an opposed lug 51, with passage through a registrable hole 52 in the flange 19, see Fig. 5 to best advantage. Attention is directed to the fact that the lug 51 is preferably offset outwards so as to provide a bump 53 serviceable to positively ensure that the lock bolts 54 shall snap firmly against the inner face of the flange 19 and thereby hold the disc 45 securely in place. It is also to be remarked that by use of the disc 45 that the inflation valve 55 as well as the hub-cap 15 and hub 13 are all closed-in, whereby the associated releasable parts are effectively protected from being tampered with until the lock 49 is released.

Having thus described my invention, I claim:

1. In a vehicle wheel of the disc type having a circumferential flange, the combination of a rim in which the tire seats, said rim embodying a central channel depression with flanking concentric cylindrical portions, an outwardly-directed flare from each cylindrical portion including an in-turned peripheral flat annular part and jointly rigidifying the rim as a unit, and a protective closure disc for the outside of the wheel with means enabling its firm attachment to the associated in-turned peripheral flat annular part of the rim, and the closure disc also having peripherally-spaced notches enabling application of anti-skid devices to the wheel, when necessary, without removal of said closure disc.

2. The invention of claim 1 wherein each flanking concentric cylindrical portion embodies an outwardly directed flare extending from said cylindrical portion, and wherein each said flare includes a comparatively wide peripheral flat inwardly directed annular part spacedly paralleling the general plane of the wheel.

3. The invention of claim 1 wherein the protective closure disc is of concavo-convex cross-section with a peripheral flat; wherein said disc is provided with a pair of spaced and relatively-stepped tongues for engagement through special slots in the in-turned peripheral flat rigidifying section of the wheel rim, at the outside thereof; wherein said closure disc embodies an outwardly-offset apertured lug diametrically opposing the tongues aforesaid; and wherein means engage through said apertured lug, and a registering hole in the rim in-turned flat section, to lock the closure disc in active position.

4. The invention of claim 1 wherein an outwardly-directed flare from one of the cylindrical portions includes an inwardly directed flat annular part; wherein the other of the cylindrical portions is angularly turned inwards to define a flat flange, wherein both the flat flange and the rim annular part parallel the general plane of the wheel; and wherein an annular clamping-ring of complemental cross-section to the rim-flare aforesaid is attachable to the second mentioned cylindrical portion flat flange, for the purpose specified.

5. The invention of claim 1 wherein each rim inwardly directed flat annular part is outwardly retroverted, into mutual abutment and wherein said outward retroversion has its peripheral portion curved outwards to define a flare, for the purpose specified.

6. The invention of claim 1 wherein one of the rim cylindrical portions further includes an inwardly directed flat annular part with an abutment extension having its peripheral portion outwardly-curved to define a flare; wherein the other of said rim cylindrical portions embodies an inwardly directed extension to define a flat flange; and wherein an annular clamping-ring of complemental cross-section to the rim-flare aforesaid is attachable to the second mentioned cylindrical portion flat flange, for the purpose specified.

GEORGE FAULDS.

REFERENCES CITED

The following references are of record in the file of this patent:

UNITED STATES PATENTS

| Number | Name | Date |
|---|---|---|
| 863,535 | Hippisley | Aug. 13, 1907 |
| 2,341,317 | Faulds | Feb. 8, 1944 |
| 1,390,893 | Elliott | Sept. 13, 1921 |
| 1,750,673 | La Brie | Mar. 18, 1930 |
| 1,402,003 | Miller | Jan. 3, 1922 |
| 1,690,981 | Jones | Nov. 6, 1928 |
| 1,858,663 | Frank | May 17, 1932 |
| 2,051,904 | Sanford | Aug. 25, 1936 |